United States Patent [19]

Alyfuku et al.

[11] Patent Number: 4,472,045

[45] Date of Patent: Sep. 18, 1984

[54] SYSTEM FOR AUDIBLY INDICATING NECESSARY INFORMATION FOR THE PHOTOGRAPHIC OPERATION OF A CAMERA

[75] Inventors: Kiyoshi Alyfuku; Masayoshi Kiuchi; Makoto Katsuma, all of Kanagawa, Japan

[73] Assignee: Canon Kabushiki Kaisha

[21] Appl. No.: 360,043

[22] Filed: Mar. 19, 1982

Related U.S. Application Data

[63] Continuation of Ser. No. 208,339, Nov. 19, 1980, abandoned.

[30] Foreign Application Priority Data

Nov. 26, 1979 [JP] Japan .................................. 54-152624

[51] Int. Cl.³ ............................................. G03B 17/18
[52] U.S. Cl. .................................. 354/467; 354/267.1
[58] Field of Search ..................... 354/289, 467, 267.1; 352/170

[56] References Cited

U.S. PATENT DOCUMENTS

| | | | |
|---|---|---|---|
| 3,776,625 | 12/1973 | Fountain | 352/170 |
| 4,072,973 | 2/1978 | Mayo | 354/238 |
| 4,174,888 | 11/1979 | Hunn et al. | 352/170 |
| 4,223,987 | 9/1980 | Shimizu et al. | 354/289 |

FOREIGN PATENT DOCUMENTS

| | | | |
|---|---|---|---|
| 2846919 | 5/1979 | Fed. Rep. of Germany | 354/289 |
| 0128735 | 10/1979 | Japan | 354/289 |

*Primary Examiner*—Russell E. Adams
*Attorney, Agent, or Firm*—Toren, McGeady and Stanger

[57] ABSTRACT

An indication system of a camera for audibly and distinguishably indicating at least two different kinds of information of the operating state of a self-timer, a warning against the photographing operation for insufficient brightness of the object or low range of a shutter speed, the voltage checking of a battery and the other necessary information for photographing operation. The indication system comprises an acoustic device having a sound which varies in volume, tone or time interval thereof in accordance with various kinds of output signals of a controlling circuit for digitally controlling the acoustic device by means of counting signals of a binary counter.

6 Claims, 5 Drawing Figures

$\overline{Q}_2$
$\overline{Q}_3$
$\overline{Q}_2 \cdot \overline{Q}_3$

BATTERY CHECK SOUND

SYSTEM FOR AUDIBLY INDICATING NECESSARY INFORMATION FOR THE PHOTOGRAPHIC OPERATION OF A CAMERA

This is a continuation of application Ser. No. 208,339, filed Nov. 19, 1980, now abandoned.

BACKGROUND OF THE INVENTION

1. Field of the Invention

This invention relates to a built-in camera information device for presenting information representative of modes of camera operation and various kinds of warnings by the use of sounds, and, more particularly, to a system for producing a sound continuously or discontinuously with or without a change in power or tone, or the variation with time of the power to thereby enable the photographer to clearly distinguish in which condition the camera is set.

2. Description of the Prior Art

In the past, the condition of whether or not the camera is satisfactorily operative, and what warning occurs, have been displayed in visual form, for example, by LED's or warning marks beyond the dynamic range of an exposure meter within the finder. With advances in the electronic design of the camera, the presentation of such information has taken the form of sound. Since the conventional acoustic display device did nothing more than provide a single sound without change in energy and tone, it was impossible to establish a distinction between the various kinds of camera information. Therefore, the conventional device was very inconvenient.

It is also known to provide display means for producing continuous and discontinuous sounds of the same power as warning signals representing the derivation of an improper exposure value due to low or high brightness and the influence of hand-shake, and another discontinous sound which takes place during the period of actuation of the self-timer, as disclosed in Japanese Laid-Open Patent No. Sho 54-37728. Since the four kinds of information, namely, improper exposure factor settings because of low and high object brightness, hand-shake warning, and the actuation of the self-timer are made to differentiate from one another by the use of only two sounds, the result is ambiguous. Further, since the self-timer goes on with a sound which is monotonous, the amount of time left to balance the set period of time is unknown to the photographer, the result being inconvenient.

SUMMARY OF THE INVENTION

It is, accordingly, an object of the present invention to provide an improved system for audibly indicating necessary information for the photographing operation of a camera which overcomes the disadvantages of prior art devices. It is another object of the invention to provide a system for audibly indicating necessary information for the photographing operation of a camera, which comprises an acoustic device and controlling device for controlling at least two of the conditions of volume, tone and successiveness of the sound of the acoustic device in accordance with the information.

It is yet another object of the invention to provide a system for distinguishably indicating with sound the information of the operating state of a self-timer, the voltage checking of a battery, the low range of shutter speed or the improper setting of an exposure device.

It is a further object of the invention to provide a system for indication of at least two kinds of the above-identified information with the above-identified distinguishable sounds of the acoustic device.

It is a further object of the invention to provide a system for audibly indicating necessary information for the photographing operation of a camera in which an acoustic device produces distinguishable sounds whose frequency, duty cycle and amplitude, i.e., tone, time interval and volume are controlled by means of a relatively low order output, two low order outputs adjacent to each other, a middle order output and a relatively high order output of a binary counter respectively.

According to the present invention, the foregoing and other objects are attained by providing within a system for indicating with sound of an acoustic device the information of the operation for a camera, a controlling circuit for controlling the acoustic device to vary volume in accordance with the information, tone by changing the duty cycle of sound pulse signals, or time interval of the alarm sound in order to provide necessary information for photographing.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference characters designate the same or similar parts throughout the figures thereof and wherein.

DESCRIPTION OF THE PREFERRED EMBODIMENT

Figure 1:
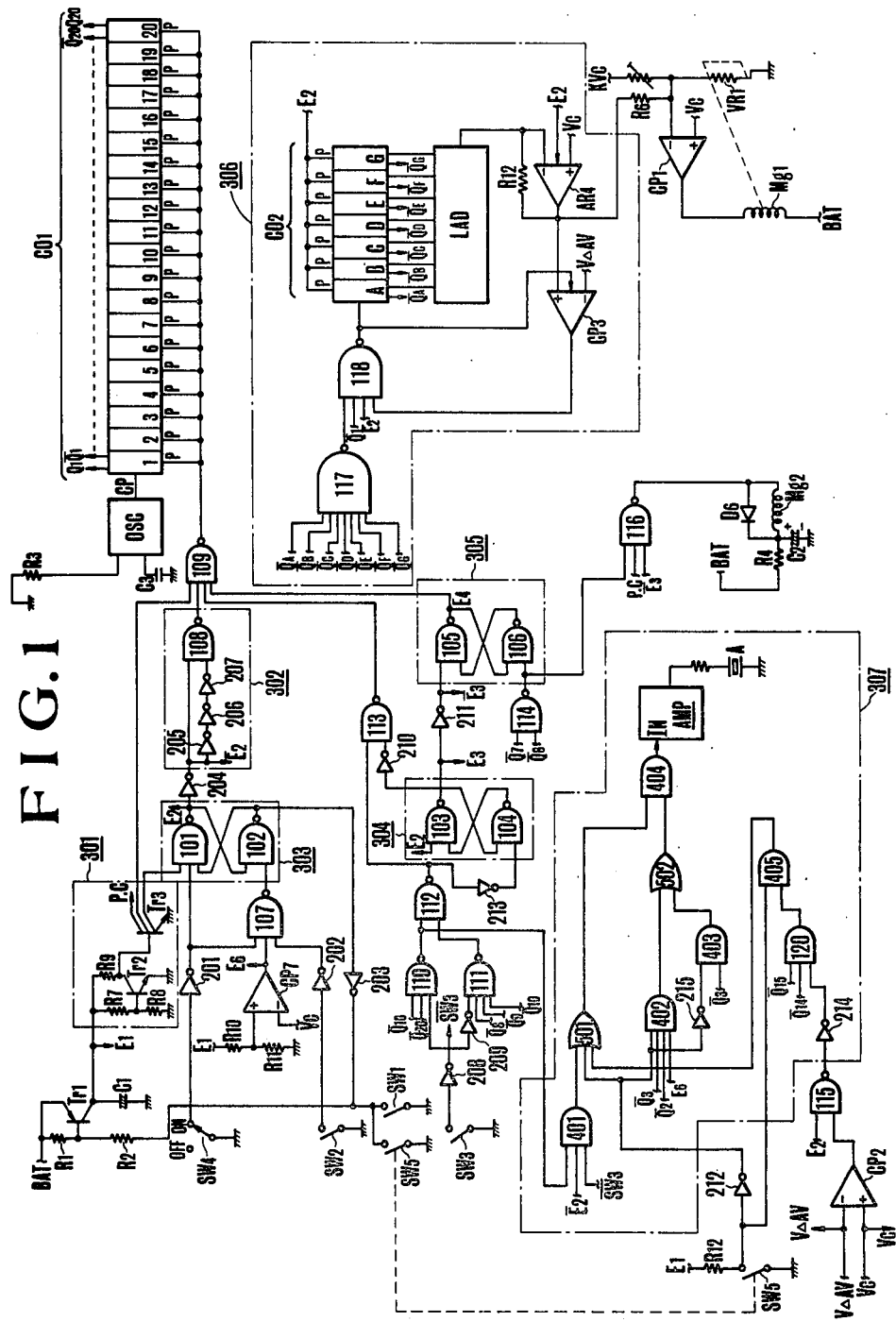
FIG. 1 is a schematic circuit diagram of one embodiment of an indicating system according to the present invention.

FIG. 1 is an electrical circuit diagram of one embodiment of an indicating system according to the present invention. In the figure, SW1 is a switch responsive to the first stroke of depression of a shutter release button for supplying electrical current from a battery BAT to all circuit portions of FIGS. 1 and 2; SW2 is a switch which is turned on when the shutter release button is further depressed to the second stroke; SW3 is a switch which is turned on when a self-timer is set in an operative position; and SW4 is a changeover switch having two switched positions depending upon the alternation of the film winding operation and the exposure operation. When the film is advanced one frame, it is moved to the ON position, and when the trailing curtain of the shutter has run down, it is moved to the OFF position. SW5 is a two-pole switch which is turned on when the battery is checked.

Mg1 is a magnet for automatic exposure control; and Mg2 is a magnet for initiating an exposure operation of the camera.

CO1 is a binary counter with a preset input P, outputs $\overline{Q1}$, Q1, ..., $\overline{Q20}$ and Q20 and a clock pulse input CP. That is, when the preset input P is of high level (hereinafter referred to the logic "1"), the Qn becomes logic "1" and $\overline{Qn}$ becomes low level (hereinafter referred to as logic "0").

OSC is a clock pulse oscillator for producing a clock pulse train of a frequency depending upon the time constant of a resistor R3 and a capacitor C3.

Element 306 includes an AD-DA converter comprising a binary counter CO2, a known resistor circuit network LAD forming a DA converter, two NAND gates 117 and 118, a comparator CP3, the operation of which is controlled by a control input (indicated by an arrow) and an operational amplifier having a resistor R12 connected in the feedback network thereof, the operation of the amplifier being controlled by a control input (indicated by an arrow).

Element 301 is a power-up clear circuit constructed with a transistor Tr2, resistors R7, R8 connected to its base, a resistor R9 connected to the collector, and a multicollector transistor Tr3 having a base electrode connected to the collector of the transistor Tr2. Element 302 is a one-shot circuit constructed with a NAND gate 108 and inverters 205, 206 and 207 connected thereto and operating in such a manner that, when the input of the NAND gate 108 is changed from logic "0" to "1", its output becomes "0" and is maintained "0" for a time equal to the delay time due to the three inverters 205 to 207. Elements 303, 304 and 305 are first, second and third flip-flop circuits, each comprised of two NAND gates 101, 102, or 103, 104, or 105, 106.

Figure 2:
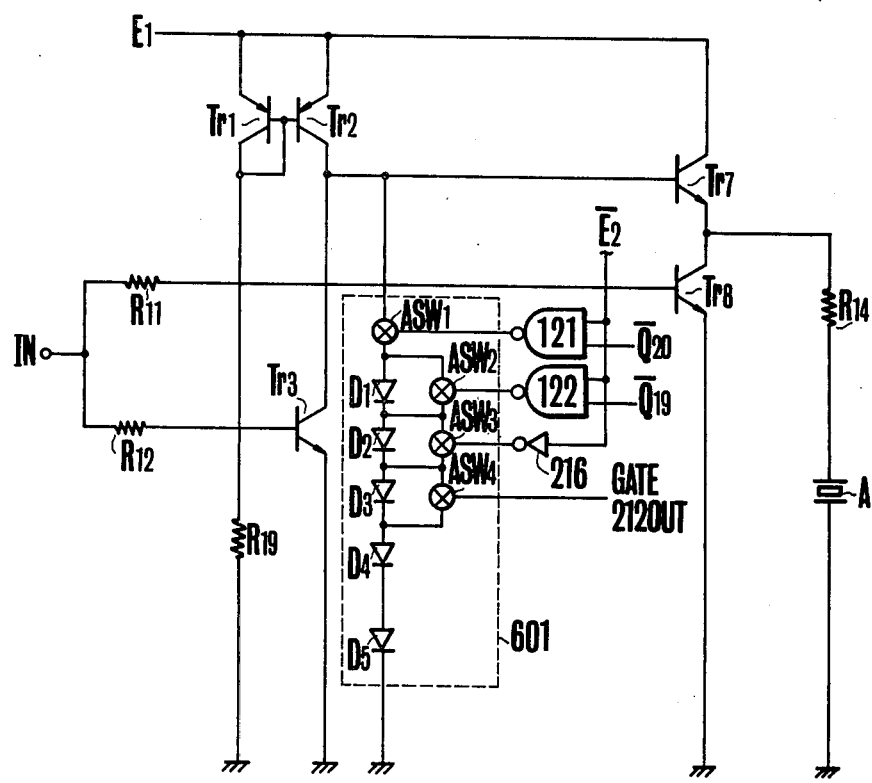
FIG. 2 is a practical circuit diagram of AMP shown in FIG. 1.
Figure 5:
FIG. 5 is a pulse timing chart showing the manner of determination of the battery check sound of 25% duty cycle and showing the 50% duty cycle signal of the alarm sound and the self-timer sound.

Element 307 is an indicating circuit comprising AND gates 401 to 405 and 120, OR gates 501, 502, inverters 214, 215, a sound amplifying circuit AMP, and a sound forming member or buzzer A, whereby when the buzzer A is excited by the output of the sound amplifying circuit AMP shown in FIG. 2, various alarm sounds are selectively produced.

FIG. 2 shows the details of an example of a practical sound amplifying circuit of FIG. 1. In FIG. 2, an actuating signal input terminal IN is connected through resistors R11, R12 to the bases of transistors Tr8 and Tr3. Connected to the collector of transistor Tr3 are the base of a transistor Tr7 and the output of a sound power control circuit 601 which comprises analog switches ASW1 to ASW4 and diodes D1 to D5. Further connected to the collector of the transistor Tr3 is a constant current circuit of transistors Tr1, Tr2 and a resistor R19 utilizing the Miller effect. The emitters of the transistors Tr1, Tr2 and the collector of the transistors Tr7 are connected to the power supply circuit (E1) of FIG. 1, and a transistor Tr8 is connected in series with the transistor Tr7 at the junction point thereof connected through a resistor R14 to the buzzer A.

Connected to the analog switches ASW1 to ASW3 are respective NAND gates 121, 122 and an inverter 216 respectively, so that the diode group of the sound power control circuit 601 and the diodes D1 and D2 are short-circuited, depending upon the outputs of the analog switches. The analog switch ASW4 is connected in parallel to the diode D2, the latter being short-circuited by the output of an inverter 212 which is connected to the battery check switch SW5 of FIG. 1. In this sound power amplifying circuit AMP, as the forward voltage of the sound power control circuit 601 increases, the buzzer A produces a sound of increasing intensity. It is noted that the diodes D4 and D5 are used in order to assure a working potential for the transistors Tr7 and Tr8, and the resistor R14 is used in order to protect these transistors. It is further noted that since the voltage clamp due to these diodes is constant regardless of loss in the battery voltage, the magnitude of sound is maintained constant.

Next, explanation will be made concerning the operation of the circuits of FIGS. 1 and 2. Now assume that the camera is ready to make an exposure, in other words, the camera is in the cocked position and, therefore, the switch SW4 has been changed over to the ON position and that an actuation of release takes place until the first stroke. In this state, the switch SW1 is ON and the power supply control transistor Tr1 is ON, thus rendering operative all the circuit portions of FIGS. 1 and 2. That is, the supplied voltage E1 is of high level, or logic "1" at which the clock pulse oscillator OSC is actuated to produce a clock pulse train appearing at the terminal CP and which is applied to the counter CO1.

On the other hand, the above-described voltage E1 causes the capacitor C1 connected to the collector of the transistor Tr1 to be charged. Then, at a time when the transistor Tr2 in the power-up clear circuit 301 changes from non-conducting to conducting, the transistor Tr3 is instantaneously turned on. That is, the output of the circuit 301 is changed to low level or logic "0" for a moment, and this is applied to the NAND gate 109, so that the output of NAND gate 109 is changed to logic "1" for a moment. By this "1" output, all of the output stages of the counter CO1 are preset. Also, the logic "0" output of the power-up clear circuit 301 causes the first flip-flop 303 to an initial state too, that is, the NAND gate 101 is set to logic "1".

The output E2 of this first flip-flop 303, after having been inverted to $\overline{E2}$ of logic "0", is applied to set the second flip-flop 304 also to an initial state. The output E3 of the flip-flop 304, after having been inverted to $\overline{E3}$ of logic "0", is applied to set the third flip-flop 305 also to an initial state where its output E4 becomes logic "1". Since, at this time, the preset input of the AD-DA converter 306, that is, the output E2 of the first flip-flop takes logic "1", all of the output stages of the counter CO2 are preset with its outputs $\overline{Q_A}$ to $\overline{Q_G}$, thus becoming logic "0". This output E2 of logic "1" also serves as the control input for the operational amplifier circuit AR4 in the AD-DA converter so that the operational amplifier circuit AR4 is controlled so that its output becomes equal to the ground potential. Since, in this state, the output of the comparator CP1 is logic "1" due to the reference voltage Vc appearing at the non-inverting input terminal thereof, the automatic exposure control magnet Mg1 is not energized. In the above stage, the voltages E1, E2, E3 and E4 all are of logic "1".

Then, when the object brightness is lower than a standard level, or when the light value is out of the dyanamic range of exposure control, as at this time the SW1 is ON to render operative the known light metering and exposure value computing circuit, and said circuits produce an output representing the number of diaphragm stops to be closed down $V_{\Delta AV}$ from the full open aperture, this output as detected by the comparator CP2 is lower than the reference voltage Vc. Therefore, the output of the comparator CP2 produces an output of logic "1" which is applied to one of the inputs of NAND gate 115. Since, at this time, the voltage E2 is logic "1", all of the inputs of the NAND gate 115 take on logic "1" and, therefore, the output of the NAND gate 115 is changed to logic "0". The inverted output of this NAND gate 115, which is of logic "1", is applied to the AND gate 120. Then, when the outputs $\overline{Q14}$ and $\overline{Q15}$ of the counter CO1 take on logic "1" simultaneously, all of the inputs of the AND gate 120 result in logic "1" and the output of the AND gate 120 becomes logic "1". This logic "1" output of AND gate 120 is applied to the AND gate 405, and since the voltage E1 is logic "1", the other input is of logic "1", so that this AND gate 405 changes its output to logic "1". This output is applied to the OR gate 501. Since, at this time, the other inputs of the OR gates 501 are supplied from the inverter 212 and AND gates 401, of which both outputs are of logic "0", the output of the OR gate 501 is determined by the output of the AND gate 405.

While the above-described output of OR gates 501 is applied to one of the inputs of AND gate 404, the other input of AND gate 404 is supplied with the output $\overline{Q3}$ of the counter CO1 through the AND gate 403 and OR gate 502, since the logic "0" output of the inverter 212, after having been inverted to logic "1" by the inverter 215, is applied to the AND gate 403. Therefore, the output of the AND gate 404 actuates the AMP at a relatively high frequency equal to that of $\overline{Q3}$ in a period determined by the AND combination of the higher stage outputs $\overline{Q14}$ and $\overline{Q15}$ than the $\overline{Q3}$, as the output of this AND gate 404 is applied to the sound amplifying circuit AMP at the input terminal IN thereof.

Figure 3:
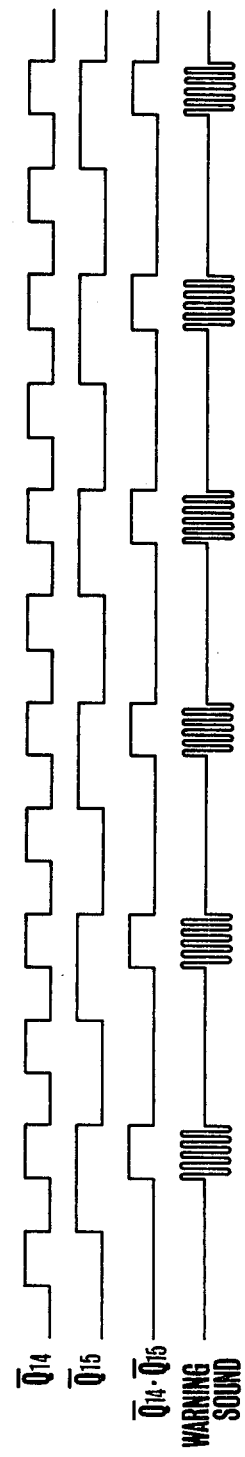
FIG. 3 is a pulse timing chart showing the manner of determination of the intermittent alarm sound for a warning against the photographing operation for insufficient brightness of the object.

FIG. 3 shows a train of sound pulses which occurs when the object brightness is very low. The sound amplifying circuit AMP amplifies the output of the AND gate 404, while the buzzer A produces a discontinuous sound at a repetitious rate equal to half the frequency of $\overline{Q14}$. The frequency in each sound pulse depends upon the $\overline{Q3}$, as has been mentioned above, and the amplitude is determined by the forward voltage of the three diodes D3 to D5 since the first stroke of release actuation leads to the production of the output E2 from the first flip-flop 303 which is of logic "1" and its inverted output $\overline{E2}$ is of logic "0", causing the outputs of the NAND circuits 121 and 122 and inverter 216 all to take logic "1" at which the ASW1 to ASW3 are closed to short-circuit the diodes D1 and D2.

Turning to FIG. 1, after the preset value of one of the exposure factors has been altered to derive a correct exposure value, the operator will proceed to further depress the shutter button to the second stroke, thereby the switch SW2 is turned on. This changes the output of the inverter 202 to logic "1". Since, at this time, the switch SW4 is in the ON position, the output of the inverter 201 is also logic "1". Further, since the battery voltage E1, after having been divided by the resistors R10 and R11 is compared with the constant voltage Vc by the comparator, when the divided value of the battery voltage E1 is sufficiently higher than the constant voltage Vc, the output of the comparator CP7 takes logic "1". (As will be seen later, the output E6 of this comparator CP7 is used in battery checking.) Thus, all of the inputs of the NAND gate 107 are logic "1". Therefore, the output of NAND gate 107 is changed to "0". This causes the first flip-flop 303 to invert with the change of the output E2 from logic "1" to logic "0". The logic "1" output of the NAND gate 102 in the flip-flop 303 also changes the output of the inverter 203 from logic "1" to logic "0". Therefore, the base of the power supply control transistor Tr1 is connected to ground by the resistors R1 and R2, so that even when the switch SW1 is turned off, the transistors Tr1 maintains the ON condition. By this, the power supply to the circuitry is sustained and the output E2 of the first flip-flop 303 is maintained at "0" and its inverted output $\overline{E2}$ at "1".

At this time, the output of the one-shot circuit 302 takes on logic "0" for a time dependent upon the inverters 205, 206 and 207 constituting part of the one-shot circuit. This signal is applied to the NAND gate 109 with the instantaneous change of its output to logic "1", so that the various output stages of the counter CO1 are preset again. After that, the output of the NAND gate 109 is inverted from logic "1" to logic "0" at which time the counting of the clock pulses from the input terminal CP starts. Also, the voltage E2 becomes logic "0" so that the control of the operational amplifier circuit AR4 in the AD-DA converter 306 is released and the output of the operational amplifier circuit AR4 is released from the ground condition. Since the potential at the inverting input terminal of the comparator CP1 to which the output of the operational amplifier circuit AR4 is connected becomes higher than the reference voltage Vc, the comparator CP1 inverts with the change of its output to logic "0", thereby the AE (Automatic Exposure) control magnet Mg1 is energized. In this condition, the NAND gate 118 is supplied with the voltage $\overline{E2}$ of logic "1", the logic "1" output of the comparator CP3 and the logic "1" output of the NAND gate 117, so that the output $\overline{Q1}$ of the counter CO1 passes through the NAND gate 118 to the counter CO2 in the circuit 306, and the counter CO2 starts to count.

As the counting advances, the output of the operational amplifier circuit AR4 lowers stepwise. When this output of the circuit AR4 coincides with the signal $V_{\Delta AV}$ from the light metering circuit, the comparator CP3 changes its output to logic "0", causing the NAND gate 118 to produce an output of logic "1" regardless of the input $\overline{Q1}$ and, therefore, causing the counting operation of the counter CO2 to stop.

With this, the automatic exposure control magnet Mg1 determines the aperture setting after the following course. The energized magnet Mg1 causes the stopper member (not shown) for determining the positions of a slider of the variable resistor VR1 and of the diaphragm blades to move with the variation of the resistance value of the variable resistor VR1 and of the position to which the diaphragm is to be closed down. When the current flowing through the resistor R6, connected between the operational amplifier circuit AR4 and the comparator CP1, coincides in intensity with that flowing through the variable resistor VR1, the comparator CP1 changes its output from logic "0" to logic "1", at which time the duration of energization of the magnet Mg1 is terminated. At this time, the resistance value of the variable resistor VR1 is made to correspond to the output of the operational amplifier circuit AR4, that is, the value of $V_{\Delta AV}$ and the stopper member also sets the diaphragm closing down stop position determining the aperture value corresponding to the value of $V_{\Delta AV}$.

Though the foregoing procedure results in the completion or preparation of closing down the diaphragm, the actual closing down operation of the diaphragm is initiated in response to energization of the camera release actuating magnet Mg2, as will be described in connection with the self-timer.

It is noted that when the battery voltage is not above the satisfactory operating level, the output of the comparator CP7 is "0", and the output of the NAND gate 107 is "1", so that the first flip-flop 303 is not inverted. Therefore, the transistor Tr1 no longer remains in a conducting condition and the power supply to the circuit is cut off so that even when the release switch is closed, the camera operation described above does not take place.

When an exposure is to be made with the use of the self-timer, the operator will first turn on the self-timer switch SW3, so that the output of the inverter 208 connected between the switch SW3 and the NAND gate 110 is changed to logic "1". Then, when the release actuation reaches the second stroke, the above-described procedure is followed by the start of counting of the counter CO1. Then, when the output $\overline{Q18}$ and $\overline{Q20}$ of the counter CO1 take on logic "1" simultaneously, as all of the inputs of the NAND gate 110 are of logic "1", the NAND gate 110 changes its output from logic "1" to logic "0".

During this time, from the moment at which the counter has started to count to the moment at which the outputs $\overline{Q18}$ and $\overline{Q20}$ coincide with each other, that is, during the period of actuation of the self-timer, the sound control circuit 307 is rendered operative, informing the operator of the passing of time as the self-timer goes on.

In more detail, when the output of the NAND gate 110 takes on logic "0", the NAND gate 112 changes its output to logic "1". Then, the inverter 213 changes its output to logic "0", causing the NAND gate 104 in the flip-flop 304 to change its output to logic "1". Since, at this time, the voltage E2 is of logic "0" because of the second stroke of the release actuation, and the input $\overline{E2}$ of the NAND gate 103 is of logic "1", responsive to this, the second flip-flop 304 changes its output E3 from logic "1" to logic "0". Therefore, the NAND gate 113 is supplied with the logic "1" output from the NAND gate 112 and the output of E3 after it has been inverted to $\overline{E3}$ of logic "1". Then the NAND gate 113 changes its output to logic "0" at which the output of the NAND gate 109 has logic "1". Thus, all of the stages of the counter CO1 are preset again.

Since the presetting of the counter CO1 leads to the production of the outputs $\overline{Q1}$ to $\overline{Q20}$ of logic "0", the NAND gate 112 changes its output to logic "0". Also, since the output of the NAND gate 113 returns to logic "1", the NAND gate 109 changes its output to logic "0". Thus, the counter CO1 starts to count again. Therefore, during the time from the moment at which the second flip-flop 304 has changed its output from logic "1" to logic "0", or the voltage E3 has take on logic "1" to the moment at which the outputs $\overline{Q7}$ and $\overline{Q8}$ of the counter CO1 take on logic "1" simultaneously, the output of NAND gate 116 is maintained at logic "0" to energize the operation start magnet Mg2. Then, a start member (not shown) of the camera mechanism is actuated. The mirror is then moved upward by a known mechanism (not shown). Then, the diaphragm closing down device operates to effect the above-described diaphragm setting. Then, the shutter is released to make an exposure. Then the trailing curtain of the shutter runs down, thus completing one cycle of exposure operation. At this time, the changeover switch SW4 is moved from ON to OFF position. Then when the film is advanced one frame, the switch SW4 is changed over to the ON position again. Thus, the camera regains the initial position and is ready to make the next exposure.

That is, with the self-timer, the counter CO1 starts to count at the second stroke of release actuation and, after the delay by the count time until outputs $\overline{Q18}$ and $\overline{Q20}$ take on logic "1" simultaneously, the exposure operation is initiated.

As above, when, in order to make an exposure with the self-timer, the output of the inverter 208 becomes logic "1" and the voltage E3 is maintained at logic "1" until the outputs $\overline{Q18}$ and $\overline{Q20}$ become logic "1" simultaneously, and the voltage $\overline{E2}$ has been changed to and maintained at logic "1" by the second stroke of the release actuation, the inputs of the AND gate 401 are all logic "1". Thus, its output is maintained at logic "1" during the time from the second stroke of release actuation to the simultaneous occurrence of the outputs $\overline{Q18}$ and $\overline{Q20}$, both of which are of logic "1", that is, until the termination of duration of the set self-timer time. This output of logic "1" is applied through the OR gate 510 to the AND gate 404 at one input thereof. Applied to the other input of the AND gate 404 is the ouput $\overline{Q3}$ through the AND gate 403 and the OR gate 502, since the AND gate 403 is supplied at the other input thereof with the logic "1" output from the inverter 215 resulting from the inversion of the logic "0" output of the inverter 212.

Therefore, the AND gate 404 produces a buzzer-actuating signal in the form of the output $\overline{Q3}$ during the self-timer period. This signal is applied to the sound amplifying circuit AMP.

Figure 4:
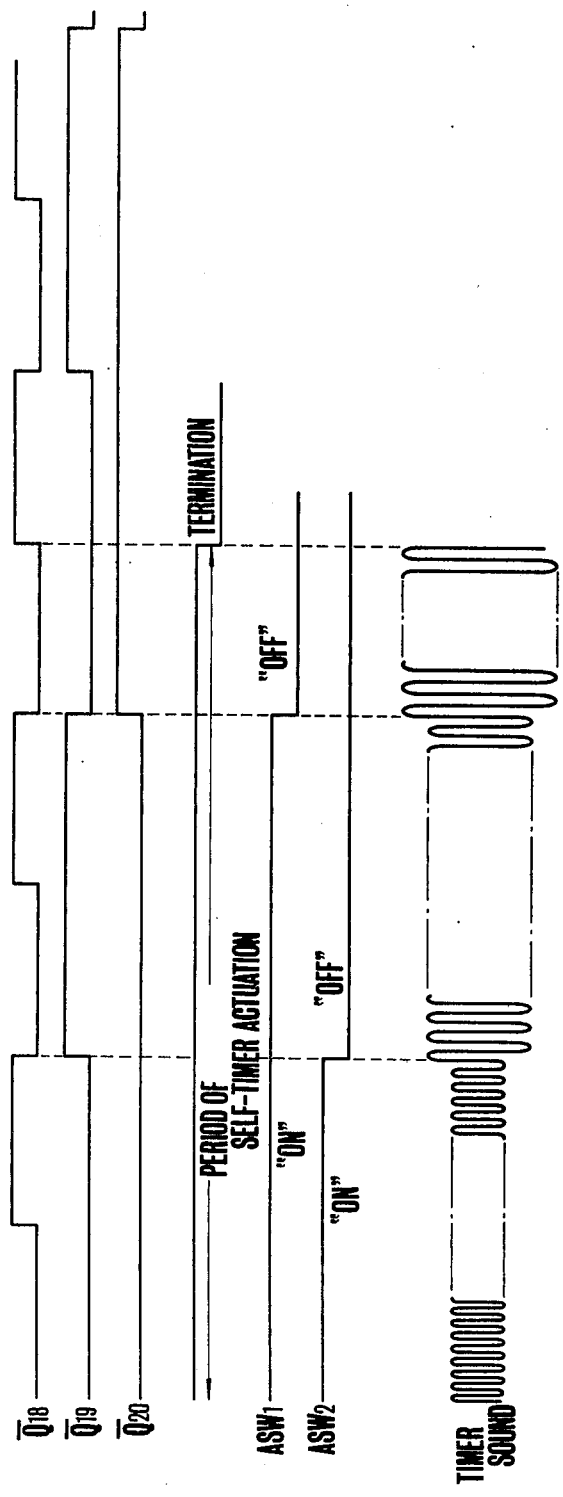
FIG. 4 is a pulse timing chart showing the manner of determination of the volume variation of a self-timer sound.

FIG. 4 illustrates discrete variation with time of the amplitude of alarm sound of the self-timer.

In FIGS. 2 and 4, since at the point in time when the self-timer starts the outputs $\overline{Q19}$ and $\overline{Q20}$ are both logic "0", and since the second stroke of release actuation leads to the production of the inverted output $\overline{E2}$ of logic "1" from the first flip-flop 303, the output of the NAND gates 121 and 122 are both logic "1", and the output of the inverter 216 is logic "0". Therefore, analog switches ASW1 and ASW2 are both ON and the ASW3 is OFF, thus short-circuiting the diode D1. Therefore, an alarm sound of power dependent upon the forward voltage of the four diodes D2 to D5 is produced from the buzzer A.

After that, when the output $\overline{Q19}$ is changed to logic "1", the NAND gate 122 changes its output to logic "0", causing the analog switch ASW2 to turn off and, therefore, causing the forward voltage of the sound power control circuit 601 to increase by that of D1 with increase in the power of the alarm sound.

When the output $\overline{Q20}$ is changed to logic "1", the diode group of the sound power control circuit 601 is released from connection with the base of the transistor Tr7, allowing all of the current to flow to the base of the transistor Tr7. Thus, the power of alarm sound reaches a maximum. Then, when the outputs $\overline{Q18}$ and $\overline{Q20}$ take on logic "1" simultaneously, since all of the inputs of the NAND gate 110 of FIG. 1 become logic "1", its output is changed to logic "0" and the AND gate 401 changes its output to logic "0". Thus, the AND gate 404 is gated off to terminate the production of the alarm sound.

Next, explanation will be made concerning the battery checking.

In FIG. 1, the battery checking operation is carried out with the switches SW1 to SW4, all set to "OFF", that is, in a condition prior to the exposure operation by depressing a known switch button (not shown) provided on the camera housing to turn on the check switch SW5. This switch SW5 is of the two-pole type. When closed, the power supply circuit is set in the ON condition, and the input of the inverter 212 is grounded. At this time, the output of the inverter 212 is changed to logic "1" and, since the other two inputs of the OR gate 501 are of logic "0", this output "1" is applied through the OR gate 501 to the AND gate 404. Since the AND gate 403 is supplied with the logic "0" output of the inverter 215 resulting from the inversion of the logic "1" output of the inverter 212, it is gated off. Therefore, when the inputs of the AND gate 402, or the outputs $\overline{Q2}$ and $\overline{Q3}$ from the counter CO1 and the output E6 from the comparator CP7 are all logic "1", its output is applied through the OR gate 502 to the AND gate 404. As has been described in connection with the second stroke of release actuation, when the battery voltage is sufficiently high, the output E6 of the comparator CP7 has logic "1", and the AND gate 404 produces a sound actuating signal $\overline{Q2} \cdot \overline{Q3}$ of the same frequency as that of the sound actuating signal $\overline{Q3}$ for the low brightness alarm and the self-timer actuation period, but of a duty cycle equal to half of that, namely, 25%.

Therefore, the tone of sound is differentiated from the former two sound tones, and the sound power depends upon the forward voltage of the two diodes D4 and D5, since the analog switch ASW4 of FIG. 2 is closed by the logic "1" of the inverter 212, and the analog switches ASW1 to ASW3 are also closed by the logic "0" voltage $\overline{E2}$ to thereby short-circuit the three diodes D1 to D3.

When the battery voltage is below the satisfactory operating level, the comparator CP7 changes its output E6 to logic "0", and the AND gate 402 is gated off. Thus, there is no sound. Therefore, the battery checking sound, when heard, informs the operator of the fact that the battery used has a sufficient voltage.

It will be seen from the foregoing that the present invention provides an alarm system for producing warning and information signals in the form of sounds with the variation of power in three discrete values dependent upon the self-timer actuation period, low brightness warning period and battery checking period, and with the further variation with time of the sound power when using the self-timer in three discrete values. The low brightness warning given off by the discontinuous sound and battery checking is associated with the alternation of the sound tone. Thus, these features enable the operator to distinguish these various states of operation clearly with his ears. It is, of course, possible to apply the principles of the present invention to other kinds of information, such as high brightness warning and hand-shake influence and, further, when the storage capacitor in the flesh unit is fully charged. Upon combination of this acoustic display with the visual display of the various kinds of camera information, the overall capabilities can be broadened and great advantage can be expected from the present invention.

While the foregoing description and drawings represent the preferred embodiments of the present invention, it will be obvious to those skilled in the art that various changes and modifications may be made therein without departing from the true spirit and scope of the present invention.

What is claimed is:

1. A system for indicating audibly necessary information for a self-timer operation of a camera, comprising:
   (a) an acoustic device for producing different signal sounds in accordance with voltages applied thereto;
   (b) power source means for changing an output voltage;
   (c) a self-timer switch to drive a self-timer mechanism;
   (d) timer means producing signals respectively after elapses of a plurality of different periods of time prescribed after the self-timer switch is turned ON; and
   (e) control means for increasing the output voltage from the power source means and for impressing it on the acoustic device every time the prescribed period of time has elapsed by the signal of said timer means.

2. A system according to claim 1, in which the timer means comprises:
   (a) a clock pulse oscillator for producing a clock pulse train; and
   (b) pulse frequency dividing means for dividing the pulse train of the oscillator and for producing plural pulse train outputs.

3. A system according to claim 1, in which the power source means includes:
   (a) a constant current circuit;
   (b) a plurality of diodes being connected in series and having an output current of the constant current circuit impressed thereon;
   (c) analog switches provided between respective anodes and cathodes of said plurality of diodes for short-circuiting said diodes by the outputs of the timer means; and
   (d) output terminals provided at the anode sides of said diodes.

4. A system for indicating audibly necessary information for a self-timer operation of a camera, comprising:
   (a) an acoustic device for producing different signal sounds by changing at least the volume thereof depending on the self-timer operation; and
   (b) sound control means for controlling a sound to be produced by said acoustic device, gradually increasing the volume at an interval of time which is determined depending on a passage of time from the moment the self-timer is set in an operative condition.

5. A system for indicating audibly necessary information for a photographic operation of a camera, comprising:
   (a) a clock pulse oscillator for producing a clock pulse train;
   (b) a pulse frequency dividing means for dividing the pulse train of the oscillator and producing plural pulse train outputs;
   (c) mode selecting means for selecting a mode from a plurality of modes including a warning mode representative of improper brightness in a photographic operation, a self-timer mode and a battery checking mode;
   (d) an acoustic device for producing signal sounds in accordance with a voltage applied thereto; and
   (e) gate means, said gate means performing an AND operation of at least two pulse trains out of said plural pulse trains according to an output of the mode selecting means, thereby impressing pulse trains with different duties corresponding to the selected mode to the acoustic device.

6. A system for indicating audibly necessary information for a photographic operation of a camera, comprising:

(a) a pulse oscillator for producing pulse trains;

(b) mode selecting means for selecting a mode from a plurality of modes including a warning mode for improper brightness in a photographic operation, a self-timer mode and a battery checking mode;

(c) duty changing means for changing the duty of pulses in accordance with the mode selecting means; and (d) an acoustic device for producing signal sounds according to an output of the duty changing means; and (e) gate means, said gate means performing an AND operation of at least two pulse trains out of said plural pulse trains according to an output of the mode selecting means, thereby impressing pulse trains with different duties corresponding to the selected mode to the acoustic device.

* * * * *